(12) United States Patent
Post

(10) Patent No.: US 9,253,559 B1
(45) Date of Patent: Feb. 2, 2016

(54) AUDIO INPUT DETECTION

(71) Applicant: Square, Inc., San Francisco, CA (US)

(72) Inventor: Daniel Jeffrey Post, San Mateo, CA (US)

(73) Assignee: Square, Inc., San Francisco, CA (US)

( * ) Notice: Subject to any disclaimer, the term of this patent is extended or adjusted under 35 U.S.C. 154(b) by 211 days.

(21) Appl. No.: 14/140,970

(22) Filed: Dec. 26, 2013

(51) Int. Cl.
*H04R 1/10* (2006.01)
*G06K 5/00* (2006.01)
*G06K 7/01* (2006.01)

(52) U.S. Cl.
CPC ............... *H04R 1/1041* (2013.01); *G06K 7/01* (2013.01)

(58) Field of Classification Search
None
See application file for complete search history.

(56) References Cited

U.S. PATENT DOCUMENTS

| | | | |
|---|---|---|---|
| 7,340,284 B2 | 3/2008 | Chung | |
| 8,915,428 B1 * | 12/2014 | Post | G07F 7/088 235/375 |
| 2008/0318629 A1 | 12/2008 | Inha et al. | |
| 2014/0131442 A1 * | 5/2014 | Morrow | G06K 7/0021 235/440 |

* cited by examiner

*Primary Examiner* — Regina N Holder
(74) *Attorney, Agent, or Firm* — Novak Druce Connolly Bove + Quigg LLP

(57) ABSTRACT

Methods, systems, and apparatus, for detecting that a component of a mobile device other than a card reader connected to the audio jack is a source of an input signal, including detecting that a card reader is connected to a mobile device via an audio jack of the mobile device. The actions include invoking an application to read captured card information sent from the card reader in response to a swipe of a transaction card. The actions include determining that the mobile device is not processing the captured card information sent from the card reader. The actions include determining that the mobile device is reading an input signal from the microphone source rather than the audio jack when the card reader is connected to the mobile device via the audio jack. The actions include changing the mobile device to processing the captured card information sent from the card reader.

25 Claims, 8 Drawing Sheets

AUDIO INPUT DETECTION

BACKGROUND

A typical mobile device has two audio inputs. One audio input is usually an audio jack, and a second audio input is usually a built in microphone. When recording, a mobile device either records the signal received from the audio jack or from the microphone. In both cases, the mobile device typically samples the analog signal received at either the audio jack or the microphone to generate a digital signal. To determine whether to process the signal from the audio jack or from the microphone, the mobile device can include circuitry to determine whether an external device is plugged into the audio jack. If an external device is plugged in then the mobile device will process the signal from the audio jack. The mobile device may also determine that sufficient sound is being received by the microphone and use that information to process the signal from the microphone.

BRIEF DESCRIPTION OF THE DRAWINGS

Like reference numbers and designations in the various drawings indicate like elements.

DETAILED DESCRIPTION

Figure 1:
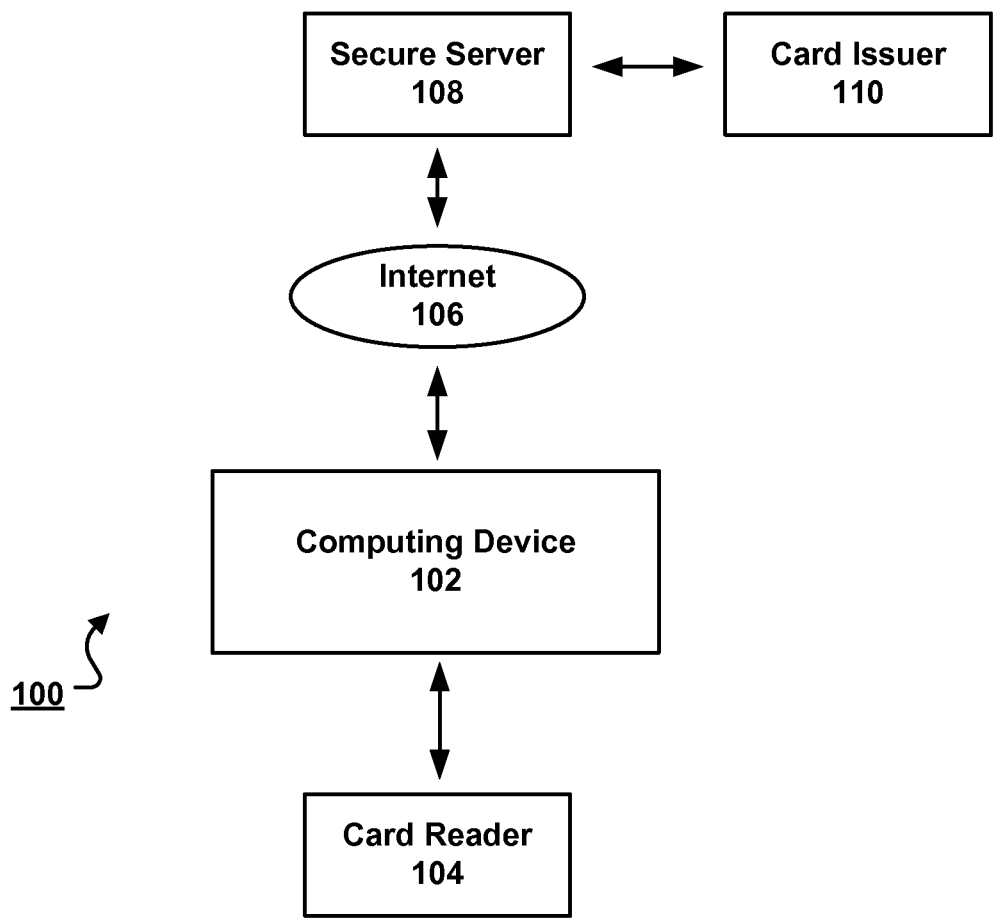
FIG. 1 is a schematic illustration of an example system for conducting a transaction using a card reader.

A mobile device can process audio received from a built-in microphone or from an audio jack. The mobile device includes circuitry to detect whether an external device is plugged into the audio jack. The circuitry may include mechanical or electrical sensing components. The circuitry provides an indication to the operating system of the mobile device as to whether an external device is plugged into the audio jack. If an external device is plugged into the audio jack, then the operating system will instruct the mobile device to process audio received from the audio jack. If no external device is plugged into the audio jack, then the operating system will instruct the mobile device to process audio received from the built-in microphone. However, sometimes the mobile device will process audio received through the microphone even if an external device is connected to the audio jack. In some instances, a particular component of the mobile device, such as the operating system, continues to route the input signal from the microphone rather than from the audio jack.

Typically, a mobile device begins to process an input signal received through a component of the mobile device from an audio source by sampling, using an analog-to-digital converter, the input signal received at either the built-in microphone or the audio jack of the mobile device. A mobile device is typically unable to process an input signal from both sources simultaneously. The input signal received through either source may not include data indicating whether it was received from the audio jack or from the microphone. As noted above, sometimes a mobile device will designate the signal received through the microphone as the input signal even if an external device is connected to the audio jack. Accordingly, when an application running on the mobile device requires an input signal received from the audio jack, the source of the input signal should be determined to avoid errors in the application.

To determine whether the source of an input signal is from the microphone or the audio jack, the mobile device can detect an audible signal in the input signal. The audible signal may include speech, ambient noise, or particular sounds such as the sound of a card being swiped through the card reader. Once the mobile device determines that the source of the input signal is the microphone, the mobile device can prompt a user to restart the application that requires an input signal from the audio jack audio recorded from the audio jack, supply the input signal again, or prompt the user to reseat the external device in the audio jack. As an example of supplying the input signal again, the mobile device may prompt the user to swipe again a card through a card reader plugged into the audio jack.

Advantages may include one or more of the following. Users may no longer receive an error when using applications that require signals that are received from the audio jack. Card reader manufacturers may get insight, such as by compiling logs, statistics, and other data, into mobile devices that exhibit this behavior and determine work around to ensure data can reliably be received from and sent to a card reader. The logs, statistics, and other data may also be shared with mobile device manufacturers to prevent future mobile devices from exhibiting this behavior.

FIG. 1 is a schematic illustration of an example system 100 for conducting a transaction using a card reader. A transaction can include reading cards such as payment cards (e.g., credit cards), driver's license cards, identification cards, etc. The system 100 is capable of processing a payment transaction between a mobile computing device 102 and a card reader 104. The computing device 102 can be a mobile device or a desktop device. Mobile devices include smart phones, tablet computers, laptops, or other mobile data processing apparatus.

The card reader 104 can process magnetic stripe cards or smart chip cards. Smart chip cards can be processed according to the Europay, Mastercard, Visa (EMV) protocol. The card reader 104 includes one or more read heads to capture card data, and a wireless transceiver to communicate wirelessly with the computing device 102. The card reader 104 need not include a keypad, a display, an interface for receiving signatures, e.g., a touch screen display, or a cellular connection to a payment processing system on an external network, e.g., the Internet. Thus, the card reader can be smaller, lighter and simpler than card readers with integrated keypads or displays.

The card reader 104 can send data to, and receive data from, the computing device 102. The card reader 104 includes an output connector, e.g., an audio output connector, through which the card reader 104 communicates with the computing device 102.

When performing a payment transaction using a magnetic stripe card, the card can be swiped through the card reader 104. The card data is sent through the physical connection, e.g., the audio jack. The remainder of the transaction can occur between the computing device 102 and other card processing systems.

When performing a payment transaction using a smart chip card, the card can be inserted into the card reader 104 so that the reader 104 engages electrical contacts for a microchip on the card. Upon inserting the card, the card reader 104 captures and sends a personal identification number ("PIN") request to the computing device through the output connector. The computing device 102 receives a PIN from the user, e.g., entered through a user interface on, or connected to, the computing device, and sends the PIN to the card reader 104 through the output connector, for confirmation. The card reader 104 sends the PIN to the card, which contains a chip with an embedded PIN. The card compares the received PIN to the embedded PIN. If the PINs match, the card sends a confirmation to the card reader 104. The card reader 104 sends the confirmation to the computing device 102 through the output connector.

After receiving data, e.g., card data or a confirmation, from either the magnetic stripe card or the smart chip card, the computing device 102 can transmit an authorization for transaction to a secure server 108 for payment processing using, for example, an external network, e.g., the Internet 106. The secure server 108 can relay the transaction to the card issuer 104, which ultimately approves or denies the transaction. The card issuer 104 can communicate the approval or denial to the secure server 108, which can communicate the card issuer's approval or denial to the computing device 102.

Figure 2:
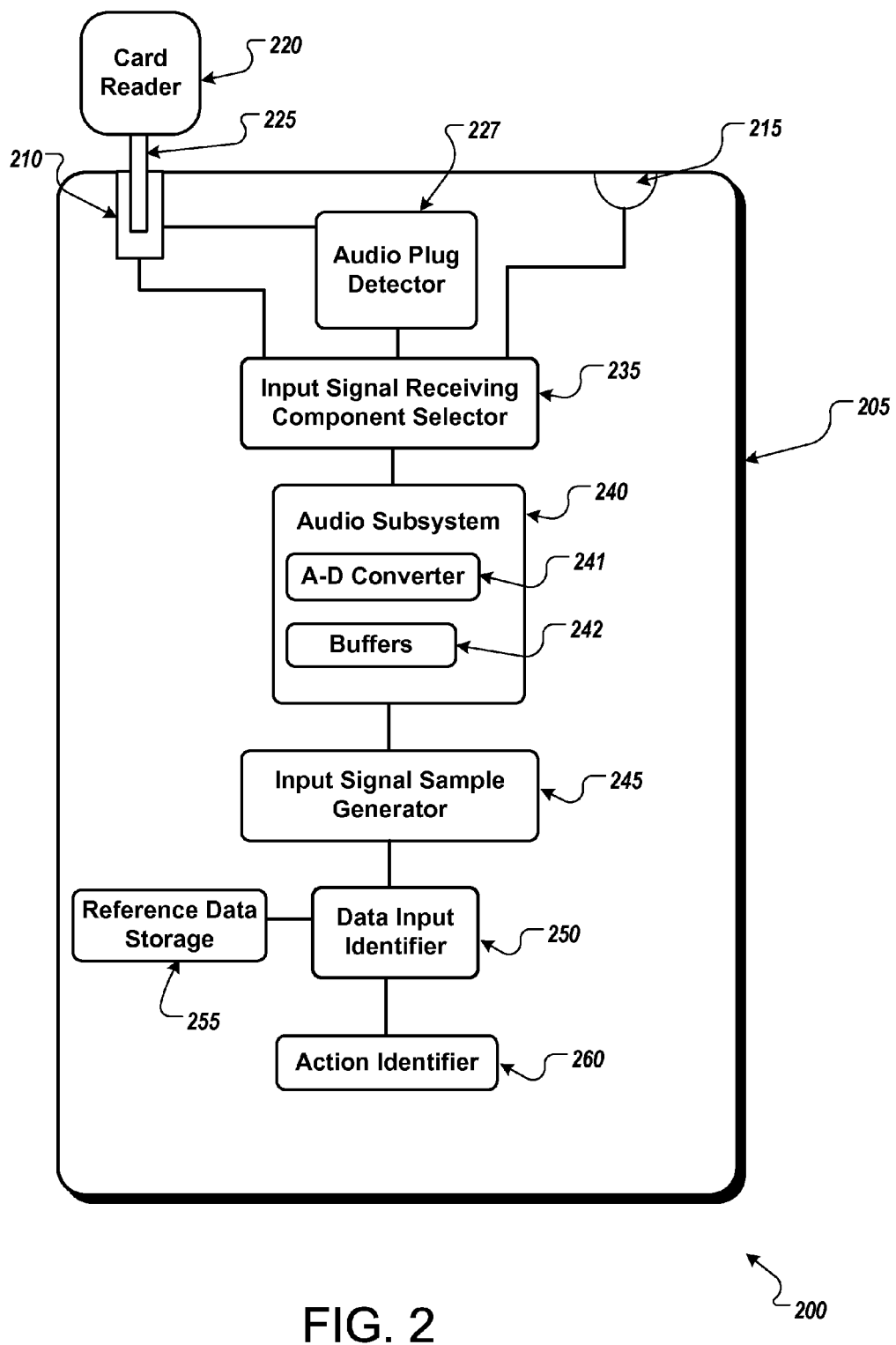
FIG. 2 is a schematic illustration of an example system for detecting an audio receiving component of a device.

FIG. 2 is a schematic illustration of an example system 200 for detecting audio misrouting. The system 200 detects, using a mobile user device 205, whether an input signal is being received and processed through the audio jack 210 or the microphone 215. The audio jack 210, or other physical connector such as a tip-ring-sleeve connector, can receive an input signal from, for example, a card reader 220. The microphone 215 can receive audio from the surrounding environment. In some implementations, the mobile user device 205 can only process an input signal from one source, either the audio jack 210 or the microphone 215. For example, the mobile user device 205 may receive and process an input signal from a person speaking through the microphone 215 or from the audio jack 210 but not both at the same time. In instances where the mobile user device 205 is processing input signals from both the microphone 215 and the audio jack 210, an application on the mobile may not be able to reliably send and receive data through the audio jack 210. The mobile user device 105 can be a smart phone, tablet, laptop, or other mobile processing device.

The system 200 may be used for conducting, for example, transactions using the card reader 220. A transaction can include reading cards such as payment cards (e.g., credit cards), driver's licenses, identification cards, loyalty cards, etc. In embodiments, the card reader 220 can process magnetic stripe cards or smart chip cards. Smart chip cards can be processed according to the Europay, Mastercard, Visa (EMV) protocol. In the illustrative embodiment shown in in FIG. 2, the card reader 220 may have one or more read heads to capture card information and transmit it through the audio jack 210 to the mobile user device 205 for processing of the transaction. In embodiments, the card reader 220 may not even include a keypad, a display, an interface for receiving signatures, e.g., a touch screen display, or a cellular connection to a payment processing system on an external network, e.g., the Internet. Thus, the card reader can be smaller, lighter and simpler than card readers with integrated keypads or displays. While the techniques described herein reference a card reader (e.g., the transaction card reader 220), it is understood that the card reader is used merely for illustration and that the techniques may be implemented with any input signal source (e.g., headphones, etc.) that may be plugged in to the audio jack of the mobile device.

The card reader 220 includes an output connector, e.g., an audio plug 225, that plugs into the audio jack 210. In some implementations, the audio plug 225 is a 2.5 mm plug, a 3.5 mm plug, or another size and the audio jack 210 is a 2.55 mm jack, a 3.5 mm jack, or another size. The audio plug 225 may have multiple contacts, e.g., a tip contact, a sleeve contact, and optionally one or more ring contacts, for transmitting and receiving data. Similarly, and the audio jack 210 may have multiple contacts for receiving data from the contacts on the plug. In some implementations, the card reader may be connected to the mobile user device 205 through a microphone jack. When connected to a microphone jack, the card reader 205 may communicate with the mobile user device 205 in a similar fashion to when the card reader 205 is connected to the audio jack 210.

When the audio plug 225 is inserted into the audio jack 210, the mobile user device 105 receives a signal that the plug is inserted into the audio jack 210. The signal that the audio plug 225 is inserted into the audio jack 210 may be generated by the audio plug detector 227. The audio plug detector 227 may be a mechanical or electrical sensor in the audio jack 110. For example, if the audio plug detector 227 is an electrical sensor, the audio plug detector 227 may detect voltage drops or impedance differences between different contacts of the audio jack 210. If the audio plug detector 227 is a mechanical sensor, then the audio plug detector 227 may contain a mechanical switch that responds to an audio plug being inserted into the audio jack 210.

With the audio plug 225 plugged into the audio jack 210, the mobile user device 205 receives an input signal from the audio jack 210 or from the microphone 215. An input signal receiving component selector 235 selects either the audio jack 210 or the microphone 215 as the audio source. Typically, when the audio plug 225 is plugged into the audio jack, audio plug detector 227 detects the audio plug 225 as being plugged into the audio jack 210. The audio plug detector 227 sends a signal to the input signal receiving component selector 235 to select input signals received from the audio jack 210. When the audio plug detector 227 does not detect an audio plug inserted into the audio jack 210, then the audio plug detector 227 sends a signal to the input signal receiving component selector 235 to select input signals received from the microphone 215. In some instances, the audio plug detector 227 makes an incorrect determination regarding whether an audio plug is inserted into the audio jack 210. When processing transactions using the system 200, a user may initiate an application on the mobile user device 205. This application may be an application to facilitate processing of the transactions involving the payment cards. The application receives captured card information from the card reader 220 and uses the captured card information to process a transaction. The application may begin processing the captured card information when the application determines that the application has received captured card information.

When the device 200 receives an input signal through either the audio jack 210 or the microphone 215, the audio subsystem 240 processes the input signal. The audio subsystem contains an analog-to-digital converter 241 and buffers 242. The analog-to-digital converter 241 samples the input signal at a particular sampling rate and a particular resolution. For example, the analog-to-digital converter 241 may sample at eight kHz, 44.1 kHz, or another sampling rate, and the resolution may be eight bits, sixteen bits, or another resolution. The audio subsystem 240 stores the digitized input signal in buffers 242. The buffers 242 store the digitized input signal so that the digitized signal may be read and further processed by an application running on the device 200.

Figure 3A:
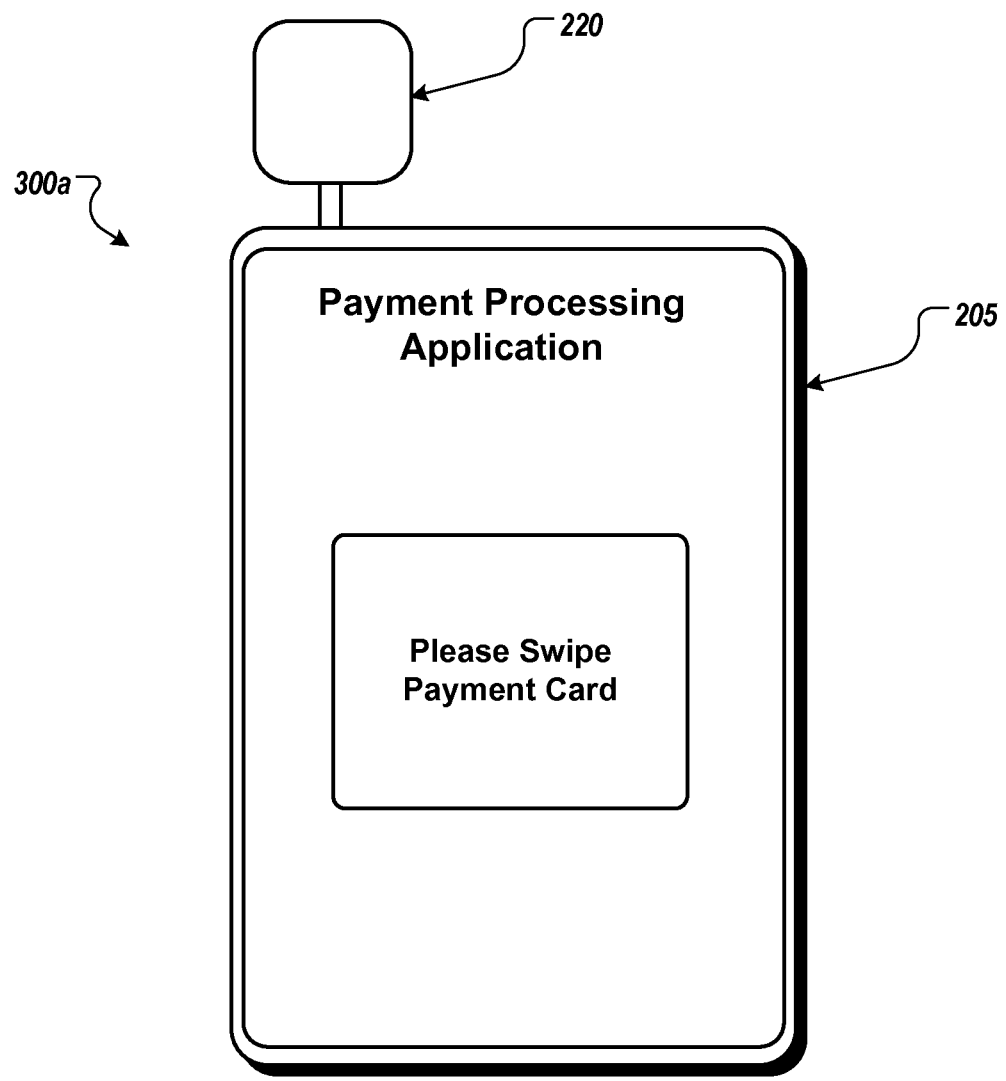
FIGS. 3A-3E illustrate example interfaces associated with detecting an audio receiving component of a device.

The application can begin reading and processing the digitized input signal in response to user input. For example, as shown in FIG. 3A with screenshot 300a, the application displays on the device 200 a prompt for the user to "Please swipe your card." In some implementations, once the application displays this prompt on the device 200, the application may instruct the input signal sample generator 245 to process the digitized signal for a particular amount of time. For example, the application may instruct the input signal sample generator 245 to process the digitized signal for ten seconds.

Figure 3B:
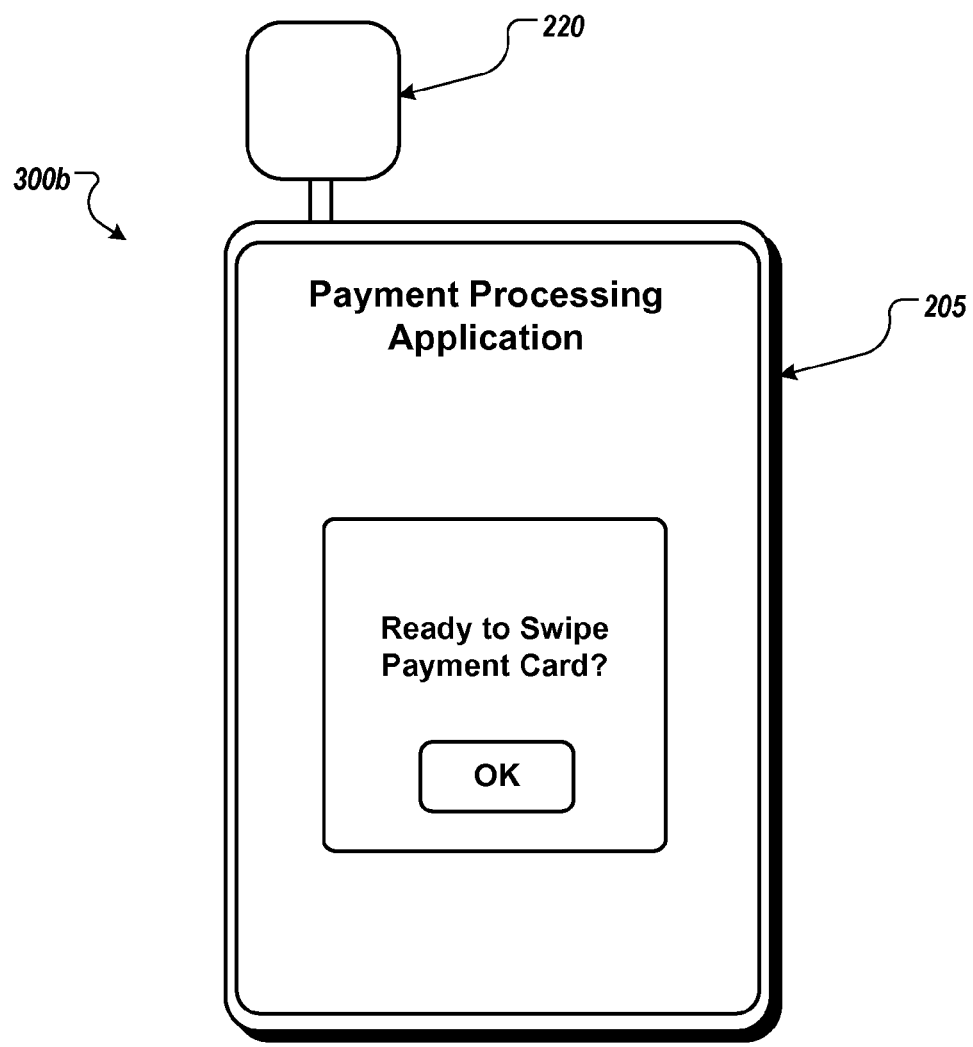

In some implementations, the application may begin reading and processing the digitized signal in response to an instruction from a user. For example, prior to using the card reader 220 to read a payment card, a user may press a card swipe button on the mobile user device 205, for example as shown in FIG. 3B with screenshot 300b. The application receives notification that that the user pressed the card swipe button and instructs the input signal sample generator 245 to process audio from the audio subsystem 240. In some implementations, the application may instruct the input signal sample generator 245 to process digitized audio for a particular amount of time. For example, the input signal sample generator 245 may process digitized audio for five seconds after the user presses the card swipe button. In some implementations, the application may instruct the input signal sample generator 245 to process digitized audio from the audio subsystem 240 until the user has pressed a swipe complete button. In some implementations, the application may instruct the input signal sample generator 245 to process digitized audio until the application has successfully received captured card information.

The input signal sample generator 245 receives digitized input signals from the buffers 242 of the audio subsystem 240 and generates input signal samples of a particular length. For example, each input signal sample may be one second long. In some implementations, the input signal sample generator 245 continuously divides the digitized input signal while the application is running on the device 200. In some implementations, the input signal sample generator 245 generates audio segments when the amplitude of the digitized audio satisfies a threshold. For example, the input signal sample generator 245 may generate input signal samples when the amplitude of the digitized input signal exceeds a threshold, such as thirty decibels.

A data input identifier 250 receives the audio samples from the input signal sample generator 245. The data input identifier 250 analyzes an input signal sample to determine whether the input signal sample was received through the audio jack 210 of the mobile user device 205. In some implementations, the data input identifier 250 compares the input signal sample to reference segments from reference data storage 255. The reference data storage 255 contains input signal samples that the device 205 or another similar device has identified as input signal samples from a particular source. For example, the sample reference data storage 255 contains one or more input signal samples that were received through the audio jack 210 from a card reader 220 and one or more input signal samples that were received though the microphone 215. In some implementations, the input signal samples in the reference data storage 255 may contain additional data. Each input signal sample may be associated with a different input type. For example, some input signal samples may be collected from a microphone and may correspond to audible noise such as ambient noise, a sound of a card swiping through a card reader, or speech. Other input signal samples may be collected from a card reader and may represent card swipes. Each input signal sample may include an identifier to indicate the source of the sample.

To compare the input signal samples from the input signal sample generator 245 with reference input signal samples from the reference data storage 255, the data input identifier 250 can determine the frequency components of the input signal sample and compare the frequency components of the input signal sample with the frequency components of the reference input signal samples. Based on the comparison of the frequency components, the data input identifier 250 may determine whether the input signal sample was received though the audio jack 210. To compare the input signal samples with reference input signal samples, the data input identifier 250 may determine whether the input signal sample are similar to manchester-modulated signals with a strong central tone at the carrier frequency (e.g., 6 KHz) and supplementary tones (e.g., from 0-12 KHz) providing information about phase shifts. Since manchester modulated signals use square waves, harmonics at 3 times of one third the amplitude and 5 times at one fifth the amplitude exist, continuing up to the sampling rate limit of the mobile device 205. Other modulation schemes may have similar consistent characteristics. For human voice, the central tone can change and the properties of the harmonics differ.

In some implementations, the data input identifier 250 analyzes the characteristics of the input signal samples and compares the characteristics to known characteristics of different reference input signal samples to determine the source of the input signal sample. For example, if an input signal sample contains frequencies between three hundred and three thousand hertz, then the data input identifier 250 can determine that the audio sample is human speech and thus was received through the microphone 215. In some implementations, the data input identifier 250 attempts to perform automatic speech recognition on the audio sample. For example, an input signal sample that an automatic speech recognizer successfully translates to text would likely be received through the microphone 215.

Figure 3C:
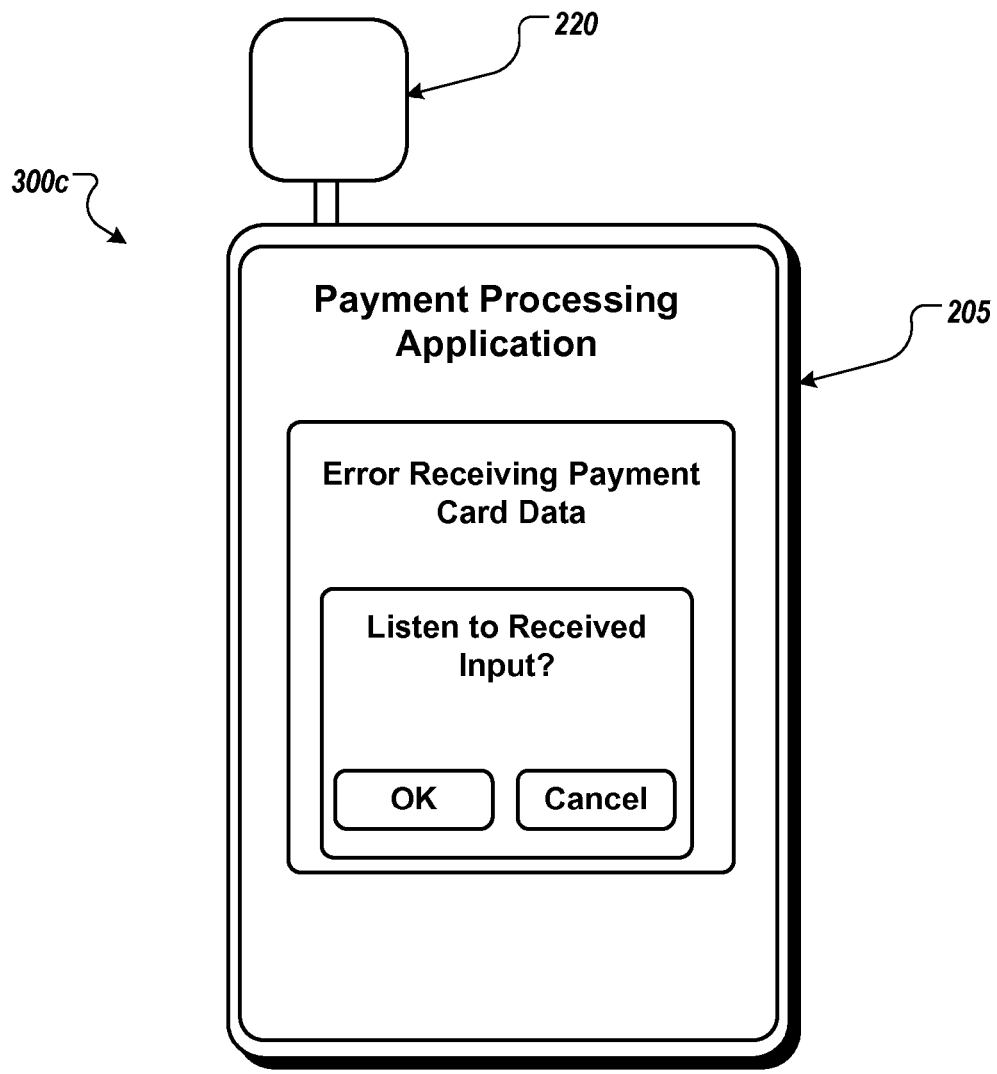

In some implementations, the data input identifier 250 may instruct the application to display a prompt to the user to replay the input signal sample over a speaker or though the audio jack 210. A user may be able to confirm that the input signal sample is recorded from the microphone 215 or from the audio jack 210. In this instance, the data input identifier 250 notifies the user that the card reader 220 is not functioning as expected and prompts the user to listen to the input signal sample to determine if the input signal sample was received through the microphone 215, as shown in FIG. 3C with screenshot 300c. A user may not be able to easily identify an input signal sample received from the card reader 220, but may be able to easily identify an input signal sample received from the microphone 215. Once the user agrees to listen to the input signal samplw, the data input identifier 250 plays the input signal sample and presents the user with several choices as sources of the input signal sample. The choices may include "microphone," "not microphone," "unknown," or "audio jack." The data input identifier 250 may then use the selection received from the user and process the audio sample if the user identified the audio sample as "not microphone" or "audio jack." In some implementations, the data input identifier 250 may store the input signal sample with the corresponding selection in the reference data storage 255 and use the audio sample as a reference input signal sample. In some implementations, the data input identifier may determine audio characteristics of the input signal sample and use the selection and the characterizes to improve future input signal sample identification.

The data input identifier 250 determines a source of the input signal sample and transmits the source to the action identifier 260. The action identifier 260 determines an appropriate action for a user or the mobile user device 205 to take in instances where the input signal sample was received through the microphone. The action identifier 260 may not need to identify any actions for the user or the mobile user device 205 when the input signal sample was received though from the card reader 220. In some instances a device besides the card reader 220 may be plugged into the audio jack 210. For example, a microphone or other device besides a card reader may be plugged into the audio jack 210. In this case, the data input identifier 250 may still identify the input signal sample as not from the card reader 220 and the action identifier 260 may determine appropriate actions based on the input signal sample not being from the card reader 220.

In some implementations, the action identifier 260 may determine that an appropriate action is to instruct the audio subsystem 240 to stop processing input signals and then to resume processing input signals. The action identifier 260 may instruct the audio subsystem 240 to stop processing input signals for a particular amount of time, for example, two seconds. During the time that the action identifier 260 has instructed the audio subsystem 240 to stop processing audio input signals, the action identifier 260 may instruct the application to display a notification on the screen of the mobile user device 205 to alert the user not to attempt to swipe a payment card in the card reader 220. For example, the action identifier may display for the two seconds that the audio subsystem 240 is not processing input signals a message stating, "Please do not swipe a payment card." Once the audio subsystem 240 resumes processing audio, then the action identifier may display a message stating, "Ready to swipe a payment card."

Figure 3D:
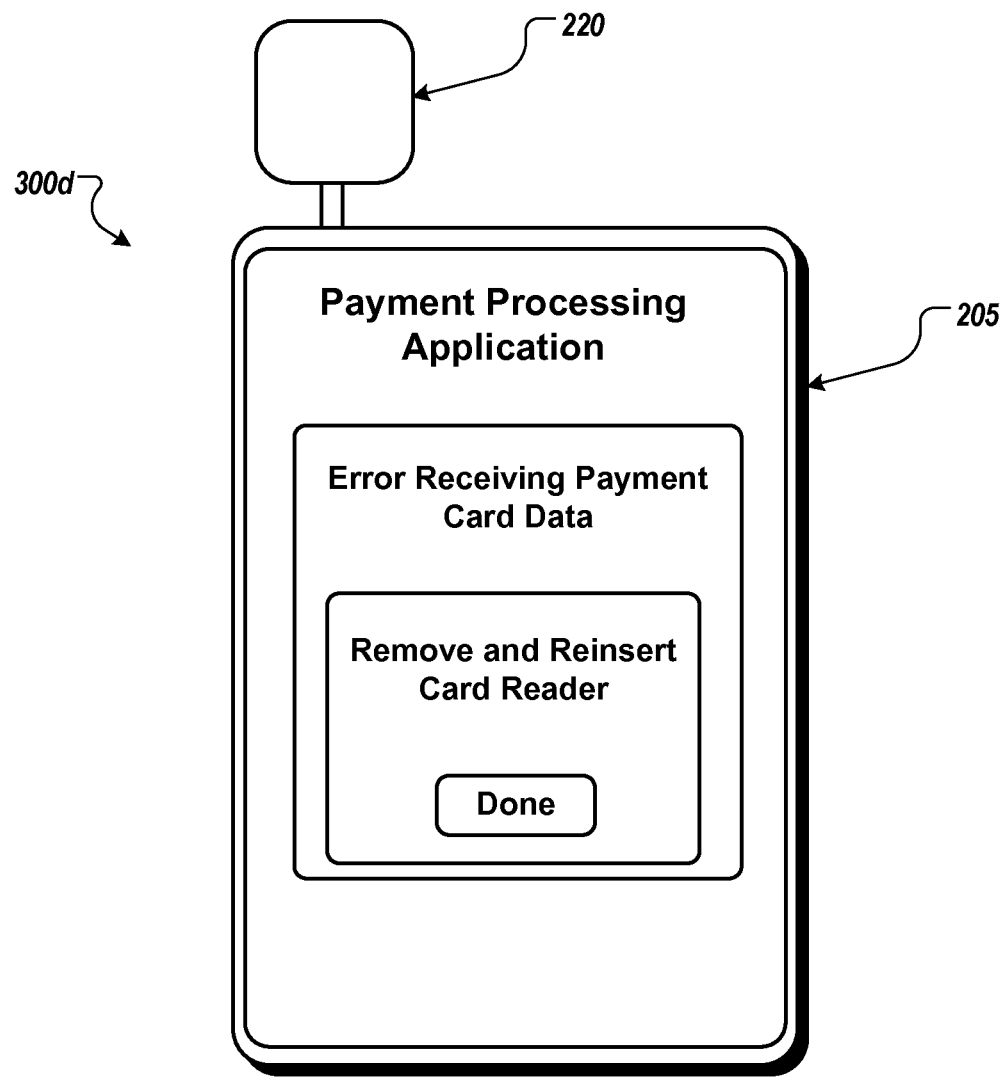

In some implementations, the action identifier 260 may determine that an appropriate action is to instruct the user of the mobile user device 205 to remove the audio plug 225 of the card reader 220 from the audio jack 210 and reinsert the audio plug 225 into the audio jack 210, for example, as shown in FIG. 3D with screenshot 300d. The action identifier 260 may instruct the application to display a message on the screen of the mobile user device 205 stating, "Please remove and reinsert the card reader." The mobile user device 205 can determine when the audio plug 225 has been removed from the audio jack 210 and when the audio plug 225 has been reinserted into the audio jack 210. Alternatively, the action identifier 260 may display an additional message on the screen of the mobile user device 205 stating, "Press OK when complete." In some implementations, the action identifier 260 may instruct the application to display a message to unplug the audio plug 225 of the card reader 220 from the audio jack 210, determine based on a signal from the audio plug detector 227 indicating that a plug is not engaged with the audio jack 210, then display a message to reinsert the audio plug 225 of the card reader 220 into the audio jack 210. Once the action identifier 260 determines that the audio plug 225 has been reinserted into the audio jack 210, either by confirmation from the user or by receiving a signal from audio plug detector 227 indicating that a plug is engaged with the audio jack 210, then the action identifier may display a message stating, "Ready to swipe a payment card."

Figure 3E:
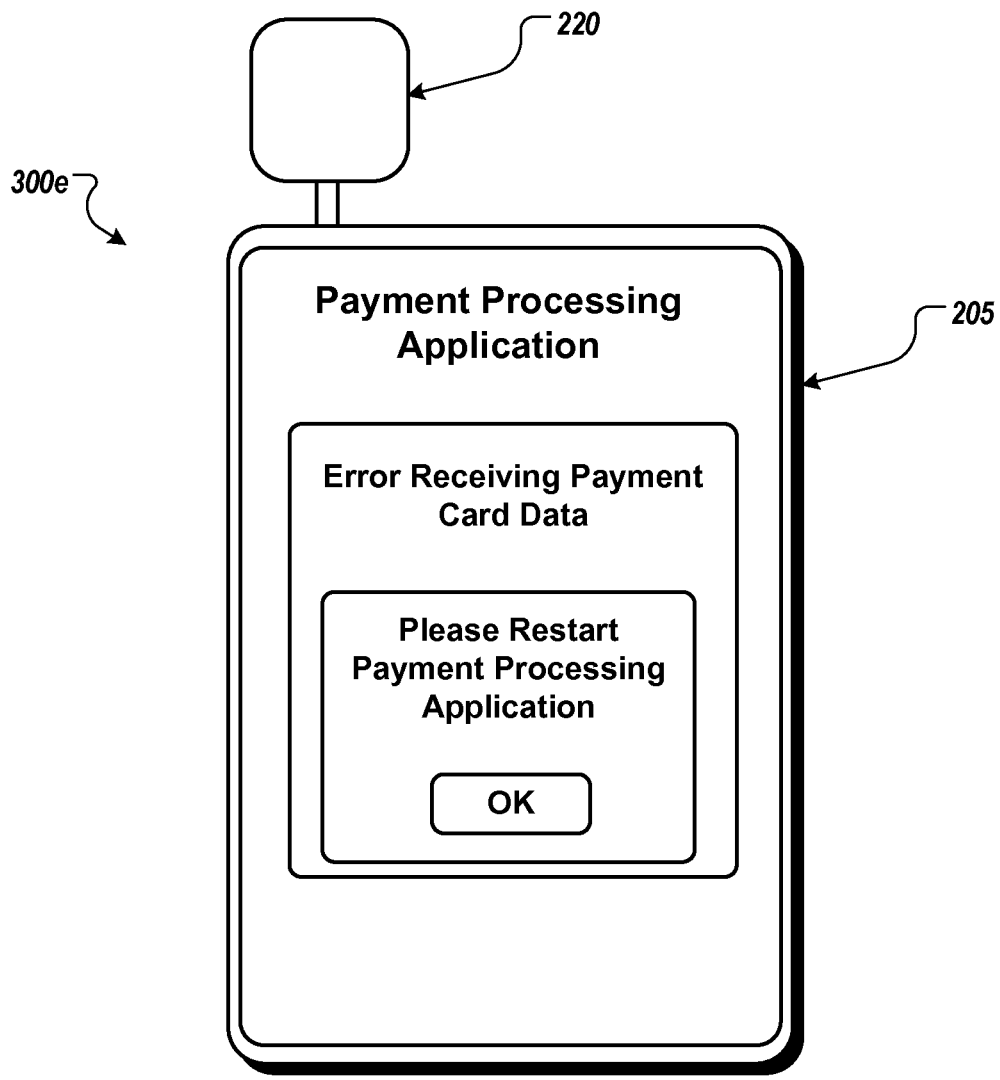

In some implementations, the action identifier 260 may determine that an appropriate action is to instruct the user of the mobile user device 205 is to restart the application running on the mobile user device 205, for example, as shown in FIG. 3E with screenshot 300e. The action identifier 260 may display a message stating, "Please restart the payment application." Alternatively, the action identifier 260 may display a message stating that the application will restart in a particular number of seconds. Once the particular number of seconds has passed, then the action identifier 260 will restart the payment application.

In some implementations, once the data input identifier 250 has determined a source for the input signal sample, the data input identifier 250 may update training data that is stored in the reference data storage 255. The training data may include a level of confidence of each reference input signal sample. For example, when the data input identifier 250 determines whether the input signal sample was received from the audio jack 210, the data input identifier 250 may also determine a confidence level associated with that determination. The confidence level may be based on a similarity of the frequency components of the input signal sample with reference input signal samples in the reference data storage 255. The training data may be used to compare with subsequently received input signal samples to determine the source of the subsequently received input signal samples.

In some implementations, the data input identifier 250 may generate a log entry that contains the input signal sample, the appropriate action, the confidence level, and any additional information related to the analysis of the input signal sample. The log entry may also contain data relating to the success of the appropriate action. The log entry may be transmitted to a server over a network. The user of the mobile user device 205 may elect to opt out of transmitting a log entry to the server.

Figure 4:
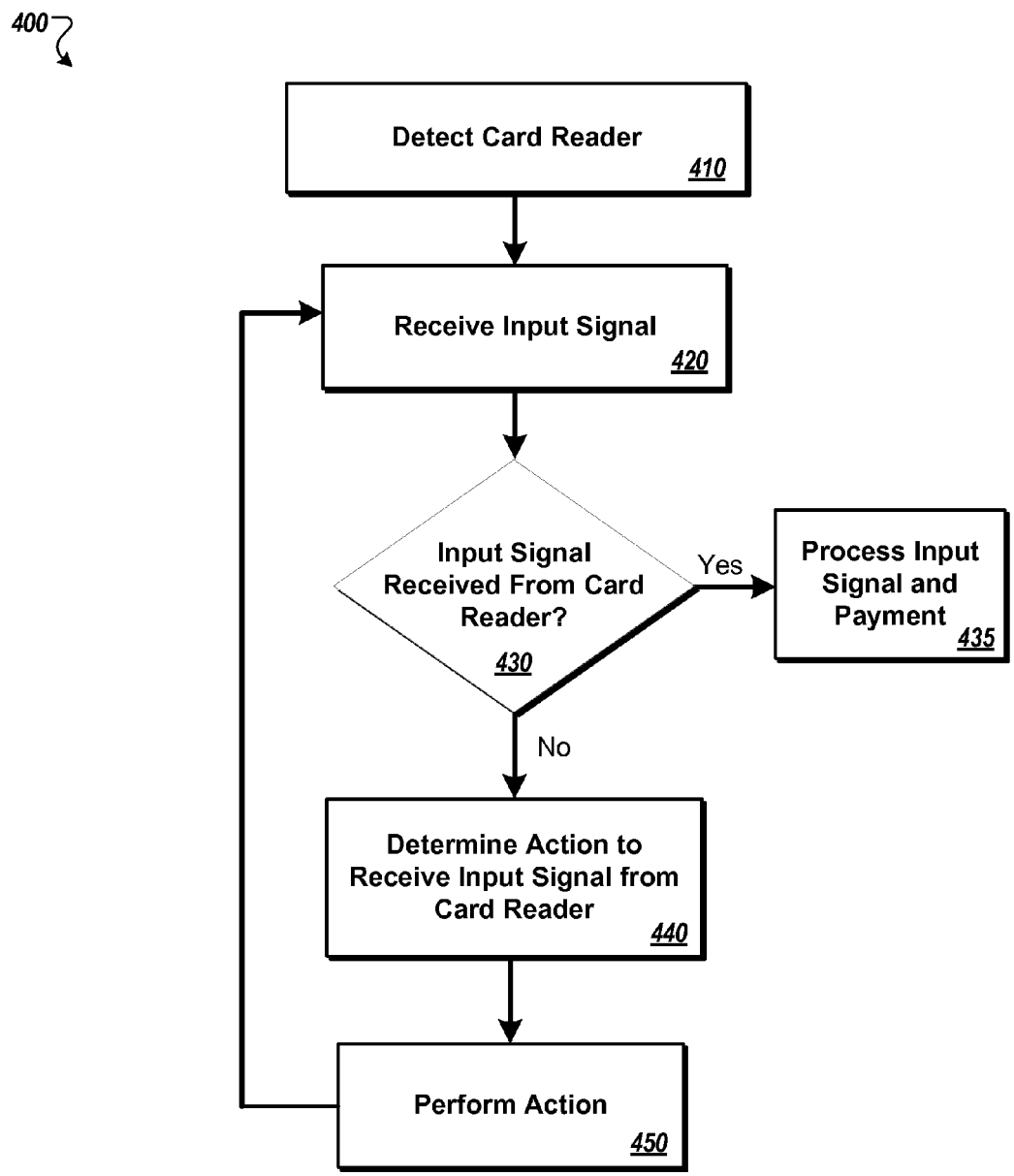
FIG. 4 is a diagram of an example process for detecting an audio receiving component of a device.

FIG. 4 is a diagram of an example process 400 for detecting an audio receiving component. The operations of the process 400 are described as generally being performed by a computing device such as the mobile user device 205. The operations of the process 400 may be performed by one of the components of the mobile user device 205 or by a combination of the components of the mobile user device 205. In some implementations, operations of the process 400 may be performed by one or more processors included in the mobile user device 205 or by an application running on the one or more processors.

The mobile user device 205 receives determines whether a card reader is engaged with the audio jack of the mobile user device 205 (410). The signal may be generated by a mechanical sensor in the audio jack 210 that detects when a plug is plugged into the audio jack 210. Alternatively, the signal may be generated by an electrical sensor that detects a conducting plug that is plugged into the audio jack 210.

The mobile user device 205 receives an input signal while the signal indicates that the audio plug 225 is plugged into the audio jack 210 so that the mobile user device 205 initially registers the input signal as being received from the audio jack 210 (420). Once the audio plug 225 is plugged into the audio jack 210, the mobile user device 205 may receive and process the input signal received through the audio jack 210. However, sometimes, an input signal receiving component selector, such as the input signal receiving component selector 235 in FIG. 2, selects the microphone as the input signal source, even when the audio plug 225 is plugged into and transmitting an input signal to the audio jack 210. An application that receives data through the audio jack 210 and that is running on the mobile user device 205 may not have direct control of the input signal receiving component selector 235.

In some implementations, the mobile user device 205 may begin to process the input signal based on the audio plug 225 being plugged into the audio jack 210 or based on the application launching on the mobile user device 205. In some implementations, the mobile user device 205 may stop processing the input signal based on the audio plug 225 being unplugged from the audio jack or based on the application closing on the mobile user device 205. The mobile user device 205 processes the received input signal if the mobile user device 205 is trying to determine the source of the input signal or if the mobile user device 205 is trying to process a transaction, such as a payment. When the mobile user device 205 is not trying to determine a source of the audio signal or process a transaction, then the mobile user device 205 may discard the received audio signal.

In some implementations, the mobile user device 205 divides the input signal into input signal samples. The input signal samples may each be a particular length, such as one second long. The mobile user device 205 may analyze the input signal sample to determine whether the input signal was received from a card reader inserted into the audio jack 210 or from the microphone 215. The mobile user device 205 may continuously analyze the input signal samples while the application is running or while the audio plug 225 is plugged into the audio jack 210 or both. Alternatively, the mobile user device 205 may analyze the input samples at particular intervals. For example, the mobile user device 205 may analyze the input samples every three minutes. The number of input signal samples and the frequency that the mobile user device 205 analyzes the input signal samples may be influenced by the available processing capability of the mobile user device 205 or the remaining battery life or both. For example, if the mobile user device 205 has only ten percent batter life remaining then the mobile user device 205 may only analyze five input signal samples every five minutes, or perhaps not at all. If analyzing audio samples utilizes twenty percent of the mobile user device's 205 processing capability, then the mobile user device 205 may analyze ten input signal samples every four minutes. However, if the mobile user device 205 does not have twenty percent of its processing capability free, then the mobile user device may forego analyzing input signal samples.

The mobile user device 205 determines, based on analysis of the input signal, whether the input signal is being received through a microphone 215 of the mobile user device 205 (430). The mobile user device 205 compares the input signal samples to reference input signal samples to determine the source, either from the microphone 215 or the audio jack 210, of the input signal sample. The reference input signal samples may be input signal samples that the mobile user device 205 has previously identified as being received from the audio jack 210 or from the microphone 215. The reference input signal samples may be device specific or operating system specific or both. For example, a mobile user device 205 model ABC-10, running operating system Mobile OS 12.0 would compare an input signal sample to other input signal samples from other ABC-10s running Mobile OS 12.0. The reference input signal samples may be provided by a server, where the reference input signal samples may be from other mobile user devices that provided reference audio samples and corresponding data to the server. The corresponding data may include the input signal source; the type of sound such as background noise, human speech, the audible sound of a card swiping, or captured card information; the model of the mobile user device; the operating system of the mobile user device; and other identifiers.

The comparison of the input signal sample with the reference input signal samples may involve comparing the frequency components of the input signal and the input signal samples. Other parameters that the mobile user device 205 may to compare the input signal sample with the reference input signal samples may be bandwidth and power. If the mobile user device 205 determines that the input signal is from the card reader, then the mobile user device processes the input signal and a payment associated with the input signal, such as a credit card payment (435).

The mobile user device 205 determines an action to change the input signal being received through the microphone 215 to being received through the audio jack 210 (440). An application running on the mobile user device 205 may be unable to directly change the source of the input signal between the microphone 215 and the audio jack 210. Instead, the mobile user device 205 determines various actions that either the mobile user device 205 can perform or can instruct a user operating the mobile user device 205 to perform.

The actions may include instructing the user to restart the application used to process magnetic stripe payment cards, or warning the user that the mobile user device 205 will automatically restart the application used to process magnetic stripe payment cards and then restarting the application. Similarly, the actions may include instructing the user to reboot the mobile user device 205 or warning the user that the mobile user device 205 will automatically reboot. The actions may include instructing the user to remove and then reinsert the card reader 220 from the mobile user device 205. The actions may include stopping to process the received input signal, then resuming processing of the input signal after a particular period of time. The mobile user device 205 performs the action, or instructs a user to perform the action (450), and then proceeds to receive an input signal again (420).

In some implementations, the mobile user device 205 updates training data with the input signal sample and any corresponding data such as the source of the input signal sample. The training data may be used for analyzing subsequently received input signal samples. In some implementations, the input signal sample and the corresponding data may be uploaded to a server over a network. The server may share the input signal sample and the corresponding data with other similar mobile user devices. The user may be able to opt out of sending the input signal sample and the corresponding data to the server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Thus, particular embodiments of the subject matter have been described. Other embodiments are within the scope of the following claims. For example, usage of the card reader may not be limited to financial transactions but could also be applied to other environments, such as processing driver's licenses.

What is claimed is:

1. A method of detecting that a component of a mobile device other than a card reader connected to an audio jack is a source of an input signal comprising:
    detecting that the card reader is connected to the mobile device via the audio jack of the mobile device, the mobile device having the audio jack and a microphone source as two separate components for receiving input signals from an external signal sources;
    invoking an application to read captured card information sent from the card reader in response to a swipe of a transaction card;
    determining that the mobile device is not processing the captured card information sent from the card reader;
    in response to determining that the mobile device is not processing the captured card information sent from the card reader, determining that the mobile device is reading an input signal from the microphone source rather than the audio jack when the card reader is connected to the mobile device via the audio jack, the determining that the mobile device is reading the input signal from the microphone source based at least in part on determining that the input signal includes audible noise elements; and
    in response to determining that the mobile device is reading an input signal from the microphone source, changing, by the mobile device, the mobile device to processing the captured card information sent from the card reader.

2. The method of claim 1, wherein changing the mobile device to processing the captured card information sent from the card reader comprises:
    determining an action to change the mobile device reading the input signal from the microphone source to the mobile device reading the captured card information sent from the card reader;
    providing instructions to a user to invoke the action;
    determining that the user invoked the action; and
    based on determining that the user invoked the action, changing the mobile device to processing the captured card information sent from the card reader.

3. The method of claim 1, wherein changing the mobile device to processing the captured card information sent from the card reader comprises:
    determining an action to change the mobile device reading the input signal from the microphone source to the mobile device reading the captured card information sent from the card reader;
    providing an indication to a user that the mobile device will invoke the action;
    invoking, by the mobile device, the action; and
    based on determining that the mobile invoked the action, changing the mobile device to processing the captured card information sent from the card reader.

4. The method of claim 2, wherein the action comprises:
    restarting the application to read captured card information;
    restarting the card reader; or
    rebooting the mobile device.

5. The method of claim 3, wherein the action comprises:
    restarting the application to read captured card information;
    restarting processing the input signal; or
    rebooting the mobile device.

6. The method of claim 1, comprising:
    based on determining that the mobile device is not processing the captured card information sent from the card reader, updating training data used in determining that the mobile device is not processing the captured card information sent from the card reader.

7. The method of claim 1, comprising:
    generating a log entry including the input signal and information associated with determining that the mobile device is not processing the captured card information sent from the card reader; and
    transmitting the log entry to a server.

8. A system comprising:
    a computing device, including a physical connector configured to engage an output connector of a card reader and a microphone, the computing device configured to:
        receive a signal indicating that the output connector is engaged with the physical connector;
        receive an input signal while the signal indicates that the output connector is engaged with the physical connector so that the computing device initially registers the input signal as being received from the physical connector;
        identifying one or more input signal samples from the input signal;
        analyzing the one or more input signal samples for information that the input signal is not captured card information from the card reader;
        determine, based on the analysis of the one or more input signal samples, that the input signal is being received through the microphone; and
        determine an action to change the input signal being received through the microphone to being received through the physical connector.

9. The system of claim 8, comprising:
    the card reader, including the output connector, a read head, and a chip card reader, the card reader configured to:
        capture card information from a swipe of a magnetic stripe card through the read head, the card reader configured to capture card information from contacts of a chip card that is inserted into the chip card reader; and
        send captured card information through the output connector.

10. The system of claim 8, wherein the computing device configured to determine, based on the analysis of the one or more input signal samples, that the input signal is being received through the microphone is further configured to determine that the one or more input signal samples includes an audible signal.

11. The system of claim 8, wherein the computing device configured to determine an action to change the input signal being received through the microphone to being received through the physical connector is further configured to:
 prompt a user to disengage the output connector from the physical connector;
 determine that the user has disengaged the output connector from the physical connector; and
 prompt the user to engage the output connector with the physical connector.

12. The system of claim 8, wherein the computing device configured to determine an action to change the input signal being received through the microphone to being received through the physical connector is further configured to:
 prompt a user to restart an application in the computing device.

13. The system of claim 8, wherein the computing device is further configured to
 based on determining that the input signal is being received through a microphone, update training data used to determine that the input signal is being received through the microphone to contain the one or more input signal samples.

14. The system of claim 8, wherein the computing device is further configured to
 generate a log entry including the one or more input signal samples and the information that the input signal is not the captured card information; and
 transmitting the log entry to a server.

15. The system of claim 8, wherein the computing device is further configured to:
 change the input signal being received through the microphone to being received through the physical connector,
 wherein changing the input signal being received through the microphone to being received through the physical connector comprises:
  providing instructions to a user to invoke the action;
  determining that the user invoked the action; and
  based on determining that the user invoked the action, changing the input signal being received through the microphone to being received through the physical connector.

16. The system of claim 8, wherein the computing device is further configured to:
 change the input signal being received through the microphone to being received through the physical connector,
 wherein changing the input signal being received through the microphone to being received through the physical connector comprises:
  providing an indication to a user that the mobile device will invoke the action;
  invoking, by the mobile device, the action; and
  based on determining that the mobile invoked the action, changing the input signal being received through the microphone to being received through the physical connector.

17. A computer-implemented method comprising:
 in a mobile device having at least an audio jack and a microphone as components for receiving external signals, receiving an input signal from an external source while an audio plug is plugged into the audio jack of the mobile device;
 determining that the input signal is from a source other than the audio plug based at least in part on determining that the input signal includes an audible signal component; and
 initiating an action to designate the audio jack as the designated source of receiving external signals.

18. The method of claim 17, wherein the action comprises:
 restarting an application to read the input signal;
 restarting the audio plug;
 restarting processing the input signal; or
 rebooting the mobile device.

19. The method of claim 17, wherein the audio plug is connected to a card reader.

20. The method of claim 17, comprising:
 based on determining that the input signal is from a source other than the audio plug based at least in part on determining that the input signal includes an audible signal component, updating training data used to determine that the input signal is a corrupt signal.

21. A method of detecting improper inputs to a card reader application, comprising:
 in a mobile user device, receiving a signal indicating that an audio plug is plugged into an audio jack of the mobile user device;
 receiving an input signal in the mobile user device while the signal indicates that the audio plug is plugged into the audio jack so that the mobile user device initially registers the input signal as being received from the audio jack;
 determining, in the mobile user device, based on analysis of the input signal, that the input signal does not originate from a card reader; and
 determining an action to change the input signal to being received through the audio jack from the card reader.

22. A method of detecting signal misrouting comprising:
 in a mobile user device, receiving a signal indicating that an audio plug is plugged into an audio jack of the mobile user device;
 receiving an input signal in the mobile user device while the signal indicates that the audio plug is plugged into the audio jack so that the mobile user device initially registers the input signal as being received from the audio jack;
 determining, in the mobile user device, based on analysis of the input signal, that the input signal is being received through a microphone of the mobile user device; and
 determining an action to change the input signal being received through the microphone to being received through the audio jack.

23. The method of claim 22, wherein determining based on analysis of the input signal that the input signal is being received through a microphone of the mobile user device comprises determining that the input signal includes speech, an audible card swiping sound, or ambient noise.

24. The method of claim 22, wherein the action to change the input signal being received through the microphone to being received through the audio jack comprises:
 stopping to process the input signal; and
 after stopping to process the input signal, processing a second input signal.

25. The method of claim 22, wherein the action to change the input signal being received through the microphone to being received through the audio jack comprises:
 prompting a user to unplug a card reader from the audio jack;
 determining that the user has unplugged the card reader from the audio jack; and
 prompting the user to plug the card reader into the audio jack.

* * * * *